United States Patent [19]

Saito et al.

[11] 4,191,459
[45] Mar. 4, 1980

[54] DIGITAL CAMERA SHUTTER CONTROL CIRCUIT HAVING MEMORY READ-OUT/SHUTTER OPENING SYNCHRONIZATION

[75] Inventors: Takeo Saito; Youichi Seki, both of Chiba; Kiyoshi Kitai, Tokyo, all of Japan

[73] Assignee: Seiko Koki Kabushiki Kaisha, Japan

[21] Appl. No.: 701,020

[22] Filed: Jun. 30, 1976

Related U.S. Application Data

[63] Continuation of Ser. No. 499,982, Aug. 23, 1974, abandoned.

[30] Foreign Application Priority Data

Aug. 24, 1973 [JP] Japan .................................. 48-95006

[51] Int. Cl.² .............................................. G03B 7/08
[52] U.S. Cl. .................................. 354/23 D; 354/50; 354/60 A; 354/51
[58] Field of Search .............. 354/23 D, 50, 51, 60 R, 354/60 A, 60 L

[56] References Cited

U.S. PATENT DOCUMENTS

| | | | |
|---|---|---|---|
| 3,742,826 | 7/1973 | Kohtani | 354/23 D |
| 3,748,979 | 7/1973 | Wada | 354/23 D |
| 3,824,608 | 7/1974 | Toyoda | 354/23 D |
| 3,836,262 | 9/1974 | Yata et al. | 354/23 D |
| 3,843,265 | 10/1974 | Egli et al. | 354/23 D |

FOREIGN PATENT DOCUMENTS

45-4903  2/1970  Japan ...................................... 354/23 D

*Primary Examiner*—Russell E. Adams
*Attorney, Agent, or Firm*—Robert E. Burns; Emmanuel J. Lobato; Bruce L. Adams

[57] ABSTRACT

A camera shutter digital control circuit having a counter for counting a number of pulses representative of exposure time and for reading-out the counted pulses to control exposure time. An adjustable delay circuit synchronizes shutter opening and the initiation of memory read-out. Upon the initiation of shutter opening a signal is applied to the delay circuit, which is adjusted to develop a delay equal to a particular shutter opening time. The delayed signal is then applied to initiate reading-out of the control pulses so that the exposure time is controlled in synchronism with the shutter opening.

6 Claims, 4 Drawing Figures

DIGITAL CAMERA SHUTTER CONTROL CIRCUIT HAVING MEMORY READ-OUT/SHUTTER OPENING SYNCHRONIZATION

This is a continuation, of application Ser. No. 499,982, filed Aug. 23, 1974, now abandoned.

BACKGROUND OF THE INVENTION

The present invention relates to an electric shutter circuit for a camera using a digital regeneration system, wherein a number of pulses corresponding to the brightness of a photographed body is counted and stored in a counting circuit, and the exposure time is automatically controlled in accordance with the stored number of pulses, and wherein the reading out of the stored pulses and shutter opening are synchronized.

An electric shutter circuit for a camera using a digital regeneration system has already been proposed and is constructed so that a light coming from a photographed body passes through a photographying lens, and the brightness of the photographed body is measured with a photoelectric element, and a single pulse having a pulse width inversely proportional to the brightness of light from the photographed body is developed. Standard pulses produced from a pulse generator during only this period are counted and stored in a counting circuit. In synchronism with the start of shutter opening, the memory value stored pulses are successively called out, and by detecting the time point when the calling-out is completed, the shutter is made to close. It is, however, difficult in this structure to synchronize the shutter opening time with the memory value calling-out time, because of the presence of fluctuation in the period of actuation of the timing switch that acts upon the start of shutter opening. Particularly in a circuit of the digital memory value calling-out time are made to synchronize, there is a difficulty at the time of regeneration in changing the frequency of calling-out phase or counting additional or reading-out pulses numbers in the counting circuit. It may be considered to provide a mechanical adjusting mechanism, but this leads to disadvantages of complicated structure and so on.

SUMMARY OF THE INVENTION

This invention aims at eliminating these defects and offers an electric shutter for a camera using a digital memory regeneration system, wherein a delay circuit having an adjustable delay time is provided in order to essentially synchronize the shutter opening time and the memory value calling-out time, and after an elapse of time determined by the delay circuit, calling-out of the pulse memory value stored in the counting circuit is started by means of a timing switch that acts in synchronism with the start of shutter opening. Then when the calling-out is finished, either a shutter closing signal is produced or the memory value stored in the counting circuit is called out synchronism with the start of shutter, closing and after an elapse of time determined by the delay circuit when the calling-out is completed, a shutter closing signal is produced to make the shutter close, whereby a precise exposure time is obtained.

DESCRIPTION OF THE PREFERRED EMBODIMENTS

Figure 1:
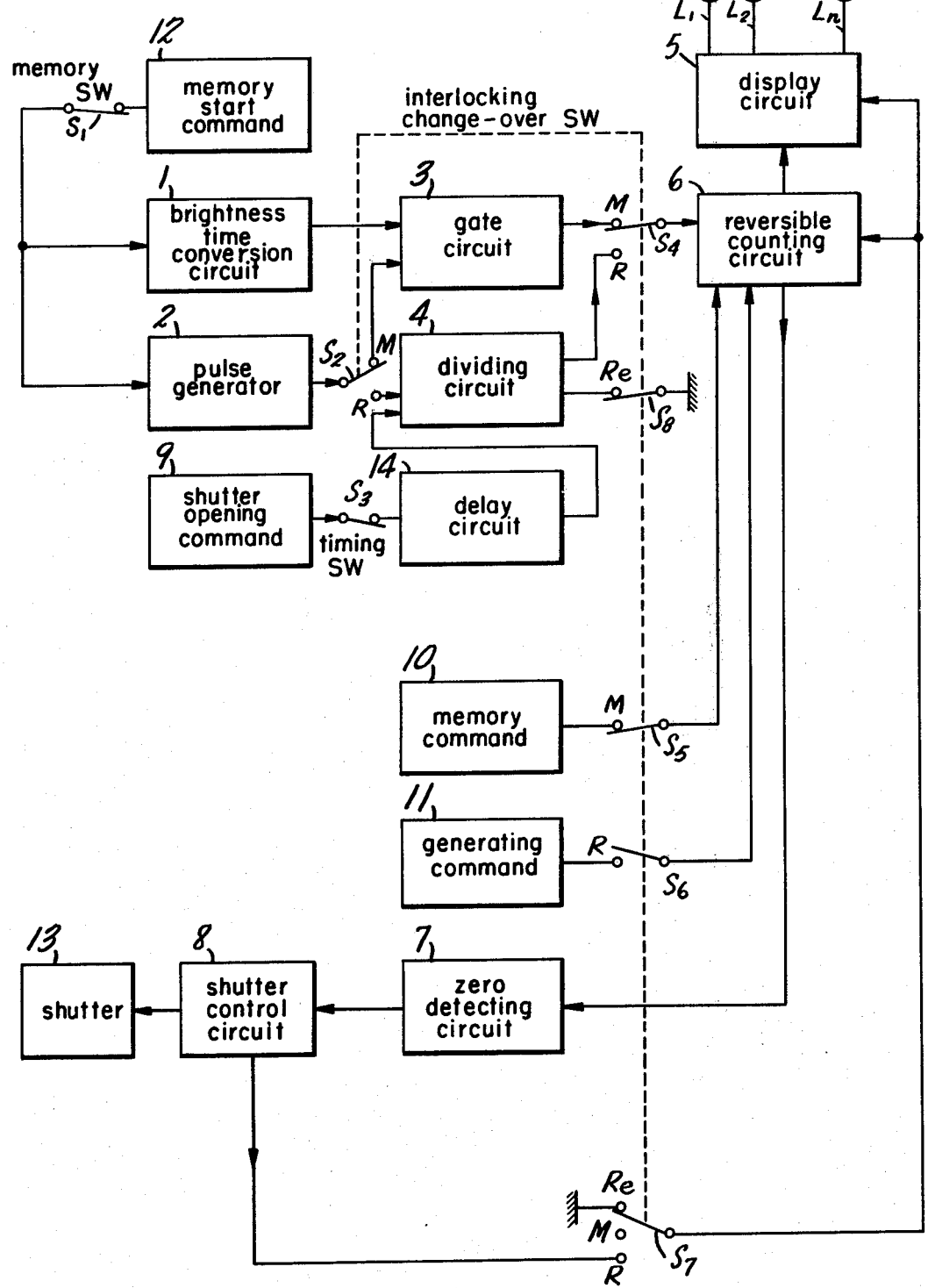
FIGS. 1 and 3 are block diagrams of different embodiments of shutter control circuit according to the invention.

Now, this invention is described referring to the drawings. FIG. 1 is a block diagram of the structure of this invention, wherein 1 is a brightness-time conversion circuit for producing a pulse having a pulse width compressed to 1/K of an exposure time corresponding to the brightness of the photographed body, 2 is a pulse generator, the frequency thereof being kept at a definite standard value, 3 is a gate circuit capable of sending a pulse produced in the pulse generator 2 to a counting circuit only during a time interval determined by the brightness-time conversion circuit 1, 6 is a reversible counting circuit comprised of a well-known binary counting circuit consisting of a flip-flop circuit, 7 is a zero detection circuit for detecting a time point when the counting value of the reversible counting circuit 6 becomes zero, and 8 is a shutter control circuit. And interlocking change-over switches for memory and calling-out S2, S4, S5, S6, S7, S8 enable contact points Re, M, R to change over successively by interlocking with the movement of a release button of a camera.

When the release button of the camera is pushed down, each switch is at the position shown in the figure, and the reversible counting circuit 6 and a frequency-dividing circuit 4 are reset, because the switches S7, S8 are earthed through the contact point Re.

By pushing down the release button further, the switch S8 is opened and the switch S7 is changed-over to the position of the contact point M, while the other switches are left at the positions shown in the figure. When a memory switch S1 is opened, a memory starting command 12 is transferred to the brightness-time conversion circuit 1 and the pulse generator 2, whereby pulses of a definite frequency produced in the pulse generator 2 pass through the switch S2, the gate circuit 3 and the switch S4 and are delivered to the reversible counting circuit 6. The various "commands" for controlling switches S1, S3, S5 and S6 which are represented by the dotted rectangles in the drawings are mechanical commands developed by structure of a camera for controlling the opening and closure of these switches. Then the reversible counting circuit 6 sums up and stores the pulses one by one that are sent through the switch S5 under control of a memory command 10.

After the time interval compressed to 1/K of the exposure time corresponding to the brightness of the photographed body has passed away, the gate circuit 3 is closed by a signal coming from the brightness-time conversion circuit 1. Thereafter, any pulse produced in the pulse generator 2 is not sent to the reversible counting circuit 6. At this time, the pulse number counted in the reversible counting circuit 6 is inversely proportional to the brightness of the photographed body; namely, in case of high brightness of the photographed body, the pulse width obtained in the brightness-time conversion circuit 1 is narrow, and the number of pulses counted in the reversible counting circuit 6 are few, while, in case of low brightness of the photographed body, the pulse width obtained in the brightness-time conversion circuit 1 is wide, and the number of pulses counted in the reversible counting circuit 6 are many. The action up to this point is, in case of a single lens reflex camera, performed before the time wherein the release button of the camera is pushed down, the reflecting mirror for the finder is raised, and the light incident to the photoelectric element is interrupted.

When the release button is further pushed down and the reflecting mirror for the finder begins to rise, the interlocking change-over switches S2, S4, S6, S7 are changed over to the position of the contact point R, then the switch S5 is opened and at the same time the shutter begins its opening action, the timing switch S3 is opened by a shutter blade opening member (not shown in the figure), a shutter opening command 9 is delivered to the delay circuit 14, and after the lapse of time determined by the delay circuit 14 a pulse from the pulse generator 2 is frequency-divided to a frequency lowered to 1/K by the frequency-dividing circuit 4, and sent to the reversible counting circuit 6 through the switch S4. Since the reversible counting circuit 6 is given a regeneration command 11 through the switch S6, the counted pulses that have been counted in the reversible counting circuit 6 are subtracted successively, and when the counting value becomes zero, the zero detection circuit 7 detects this and interrupts the current of the electromagnet that stops the shutter blade closing member (not shown in the figure) of a shutter 13 by controlling the shutter controlling circuit 8, causing the shutter to close by releasing the shutter blade closing member. Then a shutter closing signal obtained in the electromagnet is transmitted to the reversible counting circuit 6 through the change-over switch S7, and resets the reversible counting circuit 6. The structure described above is described in more detail in our copening application Ser. No. 499,983, filed Aug. 23, 1974.

Pulse frequency at the storing time and the pulse frequency at the calling-out time has been taken at 1:1/K is that, in case of storing the brightness of the photographed body in the reversible counting circuit 6, the storing is made in the initial stage of pushing down of the release button so that, particularly when the brightness of the photographed body is low, a long time is needed for storing the pulses in the reversible counting circuit 6, resulting in an error of exposure due to rapid pushing down of the release button. Supposing tentatively that the longest exposure time controllable by the reversible counting circuit 6 is one second and the time required from pushing down of the release button and opening of the memory switch S1 to the beginning of rise of the reflecting mirror for the finder is twenty milliseconds, the ratio between the pulse frequency at the storing time and the pulse frequency at the calling-out time may be taken at 1:1/50.

Figure 2:
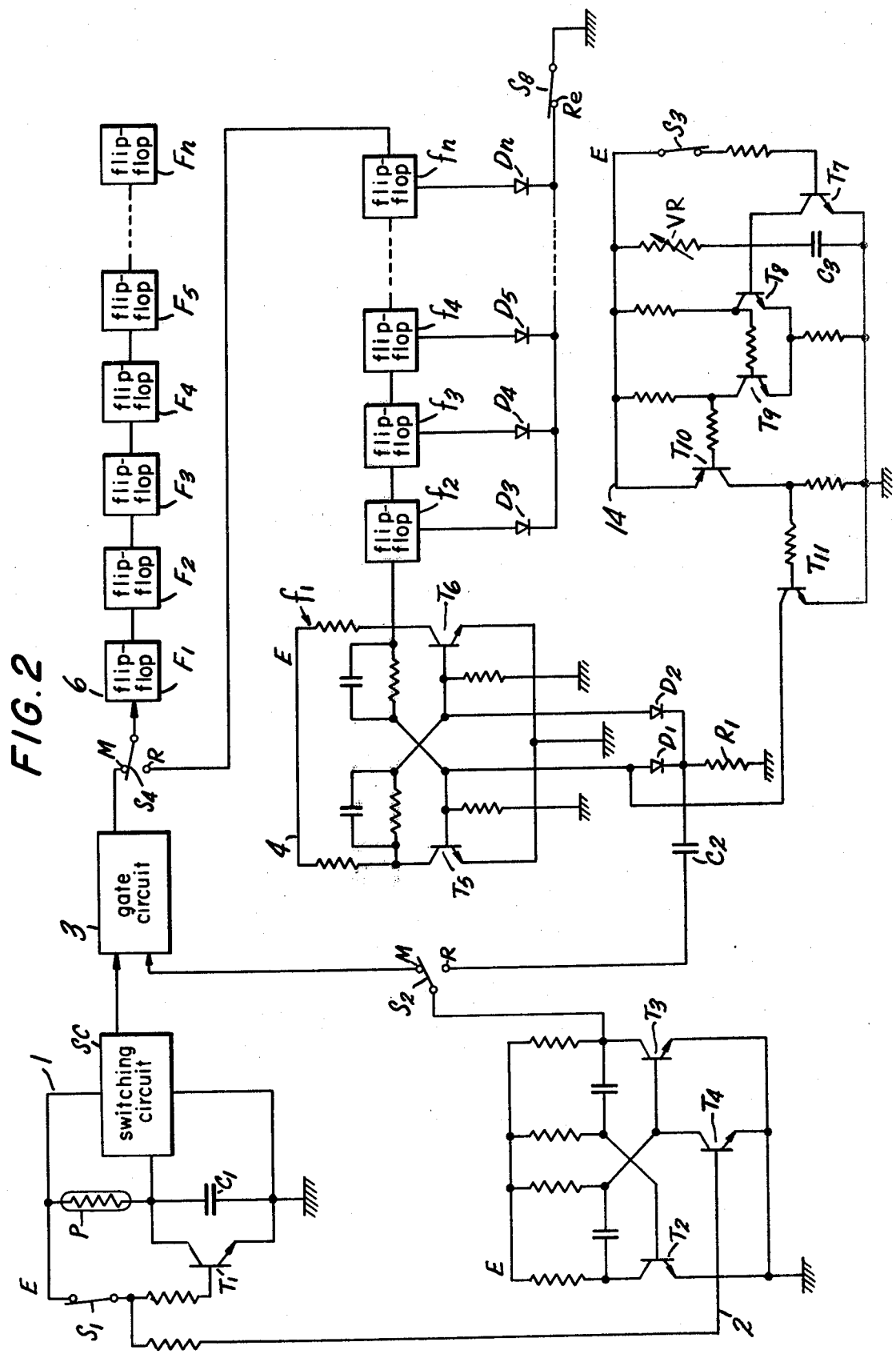
FIGS. 2 and 4 are schematic circuit diagrams of the circuits represented in FIGS. 1 and 3, respectively.

FIG. 2 shows an embodiment of each block described in FIG. 1. In FIG. 2, a block corresponding to that shown in FIG. 1 is indicated by the same number, and the zero detection circuit 7, the shutter control circuit 8, etc. that do not directly relate to the principal features of this invention are omitted.

In FIG. 2, 1 is the brightness-time conversion circuit, wherein, as shown in the figure, a photoelectric element P (e.g. CdS) and a condenser C1 are connected in series, and the voltage-dividing point thereof is connected to a switching circuit SC, and the switching circuit SC produces an output signal when the charging current of the condenser C4 reaches a certain predetermined level, thereby closing the gate circuit 3. To both ends of the condenser C1 are connected the collector and the emitter of a transistor T1, and the base thereof is connected to an electric source E through the memory switch S1. 2 is a pulse generator composed of an astable multivibrator comprised of transistors T2, T3, etc., and between the base and the emitter of the transistor T4, and the base thereof is connected to the memory switch S1 through a resistance. A pulse having a definite frequency produced at the collector of the transistor T3 is led to the gate circuit 3 at a storing time through the switch S2, and at a calling-out time of the counting value is applied to a flip-flop circuit f1 of the first stage of the frequency-dividing circuit 4 through a condenser C2 of the frequency-dividing circuit 4. 6 is a reversible counting circuit, wherein well-known flip-flop circuit stages F1, F2, F3, F4, F5, . . . , Fn are connected in cascade as shown in the figure. The frequency-dividing circuit 4 is comprised of a well-known flip-flop circuit including the transistors T5, T6, etc., and to the flip-flop stages beyond the second stage f2, f3, f4, . . . , fn are connected diodes D3, D4, D5, . . . , Dn respectively, and the cathodes of the respective diodes are connected together to be connected to the earth through the switch S8.

The delay circuit 14 is a Schmidt circuit comprised of transistors T8, T9. The base of the transistor T8 is connected to a variable resistor VR and a condenser C3 as shown in the figure, and further to both ends of the condenser C3 are connected the collector and the emitter of a transistor T7, and the base thereof is connected to the electric source E through the timing switch S3. The collector of the transistor T9 is connected to the base of the transistor T10 through a resistance, the collector thereof is connected to the base of the transistor T11, and the collector of transistor T11 is connected to the base of the transistor T5 of the first stage flip-flop circuit f1 of the frequency-dividing circuit 4. As for the resistance value of the variable resistor VR, it is adjusted beforehand to correspond to the individual shutter so as to make the shutter opening time and the memory value calling-out time synchronize.

Now, the operation of the circuit is described. Following pushing-down of the release button, each of the flip-flop circuits F1, F2, F3, F4, F5, . . . , Fn of the reversible counting circuit 6 is reset by a reset signal not shown in the figure. On the other hand, as the memory switch S1 is being closed, the transistors T1, T4 are in a conductive state respectively, the condenser C1 of the brightness-time conversion circuit 1 is short-circuited by the transistor T1, the base potential of the transistor T3 of the pulse generator 2 does not produce any pulse because it is lowered approximately to the earth potential due to the conductive state of the transistor T4. And, since the timing switch S3 is being closed in the delay circuit 14, transistor T7 assumes a conductive state. Therefore, the transistor T8 becomes non-conductive, the transistors T9, T10, T11 become conductive, and the collector potential of the transistor T11 lowers nearly to the earth potential, so that the transistor T5 of the first stage flip-flop circuit f1 of the of the frequency-dividing circuit 4 becomes non-conductive because its base potential lowers nearly to the earth potential, causing f1 to be reset. The flip-flop circuits of other stages f2, f3, f4, . . . fn are also reset in a well-known manner because they are connected to the earth by the switch S8 through the diodes D3, D4, D5, . . . , Dn.

By pushing down the release button further, the switch S8 is opened and the memory switch S1 is also opened. In this case, the switches S2, S4 are at the position of contact point M as shown in the figure, and the timing switch S3 still remains in a closed state.

When the memory switch S1 is opened, the transistors, T1, T4 become non-conductive due to interruption of their base current, and at the same time a current flows into the condenser C1 from the electric source E through a photoelectric element P arranged in the light path of the photographing lens to start charging of the condenser. On the other hand, as the transistor T4 is non-conductive, an astable multivibrator consisting of the transistors T2, T3, etc. begins oscillation, and pulses of a definite frequency produced from the collector of the transistor T3 pass the gate circuit 3 through the switch S2 and the contact point M, then enter the reversible counting circuit 6 through the switch S4, and the reversible counting circuit 6 sums up the pulses coming into it successively.

When the charging of the condenser C1 reaches a certain predetermined level, the switching circuit SC is reversed producing an output signal and closing the gate circuit 3. Therefore, a pluse from the collector of the transistor T3 cannot pass the gate circuit 3. Since the pulse number counted by the reversible counting circuit 6 depends on the time from opening of the memory switch S1 up to the change of state of the switching circuit SC of the brightness-time conversion circuit 1, in case of high brightness of the photographed body, the condenser C1 is rapidly charged because the resistance of the photoelectric element P is low, and as the time up to the change of state of the switching circuit SC is short, the number of pulses counted in the reversible counting circuit 6 are few. On the other hand, in case of low brightness of the photographed body, as the resistance of the photoelectric element P is high, the condenser C1 is gradually charged and the time up to the change of state of the switching circuit SC is long and therefore, the number of pulses counted in the reversible counting circuit 6 are many. The operation up to this point is, in case of a single lens reflex camera, performed before the release button of the camera is pushed down, the reflecting mirror for the finder is raised, and the light incident to the photoelectric element P is interrupted.

When the release button is further pushed down and the reflecting mirror for the finder begins to rise up, the switches S2, S4 are changed over from the M side of the contact point to the R side. By changing-over the switch S2 to the R side of the contact point, the pulse produced from the collector of the transistor T3 is sent to the first stage flip-flop circuit f1 of the frequency-dividing circuit 4 through the condenser C2, but frequency-dividing does not occur because of the conductive state of the output transistor T11 of the delay circuit 14.

When the shutter blade begins opening and thereby the timing switch S3 is opened by the shutter blade opening member (not shown in the figure), the transistor T7 becomes non-conductive because of interruption of its base current. Owing to the non-conductive state of the transistor T7, a current flows into the condenser C3 through the variable resistor VR, then the condenser C3 begins to charge, and after the elapse of time determined by the resistance of the variable resistor VR and the capacity of the condenser C3, the transistor T8 becomes conductive.

As the transistor T8 becomes conductive in this way, the transistors T9, T10 become non-conductive, therefore the transistor T11 also becomes non-conductive, and the collector potential thereof rises up causing the flip-flop circuit f1 to start frequency-dividing. A pulse from the pulse generator 2 is differentiated in a differentiation circuit comprising the condenser C2 and the resistance R1 through the switch S2 to become a negative pulse, which is impressed on the bases of the transistors T5, T6 through the diodes D1, D2 and assumes, as is well-known, a frequency lowered to 1/K of the frequency of the standard pulses produced from the pulse generator 2. The output of the flip-flop circuit f1, f2, f3, f4, . . . ,fn, then is sent to the reversible counting circuit 6 through the switch S4, and subtracts the counting values counted in the reversible counting circuit 6 one by one and, when the counting value counted in the reversible counting circuit becomes zero, causes the shutter to close as described in FIG. 1.

Figure 3:
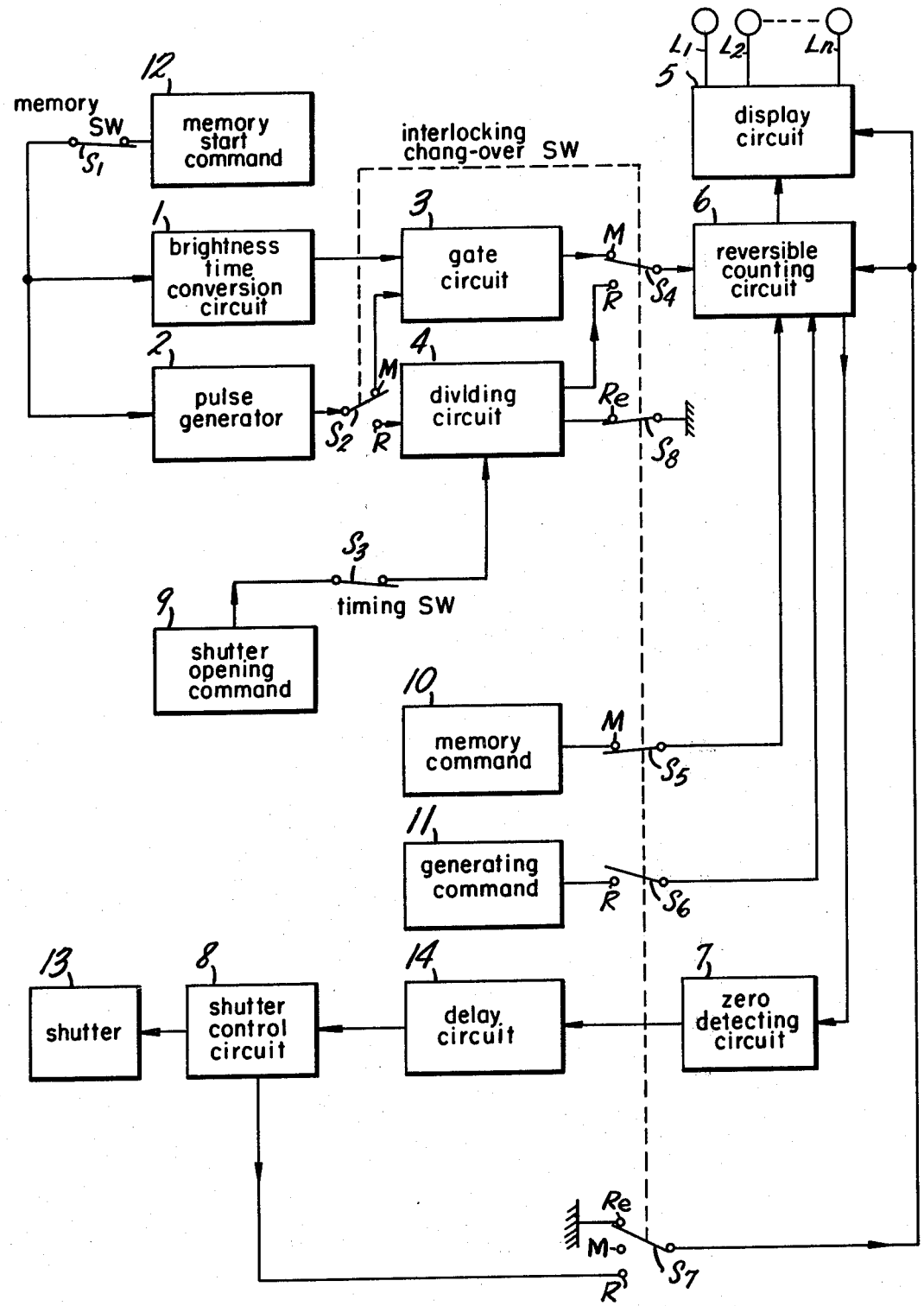

FIG. 3 is a block diagram of an embodiment, wherein the delay circuit 14 shown in FIG. 1 is provided between the zero detection circuit 7 and the shutter control circuit 8, that is, a shutter closing signal produced in the zero detection circuit 7 when calling-out is completed is delayed in the delay circuit 14. Thereafter, the shutter is closed by controlling the shutter control circuit 8.

Figure 4:
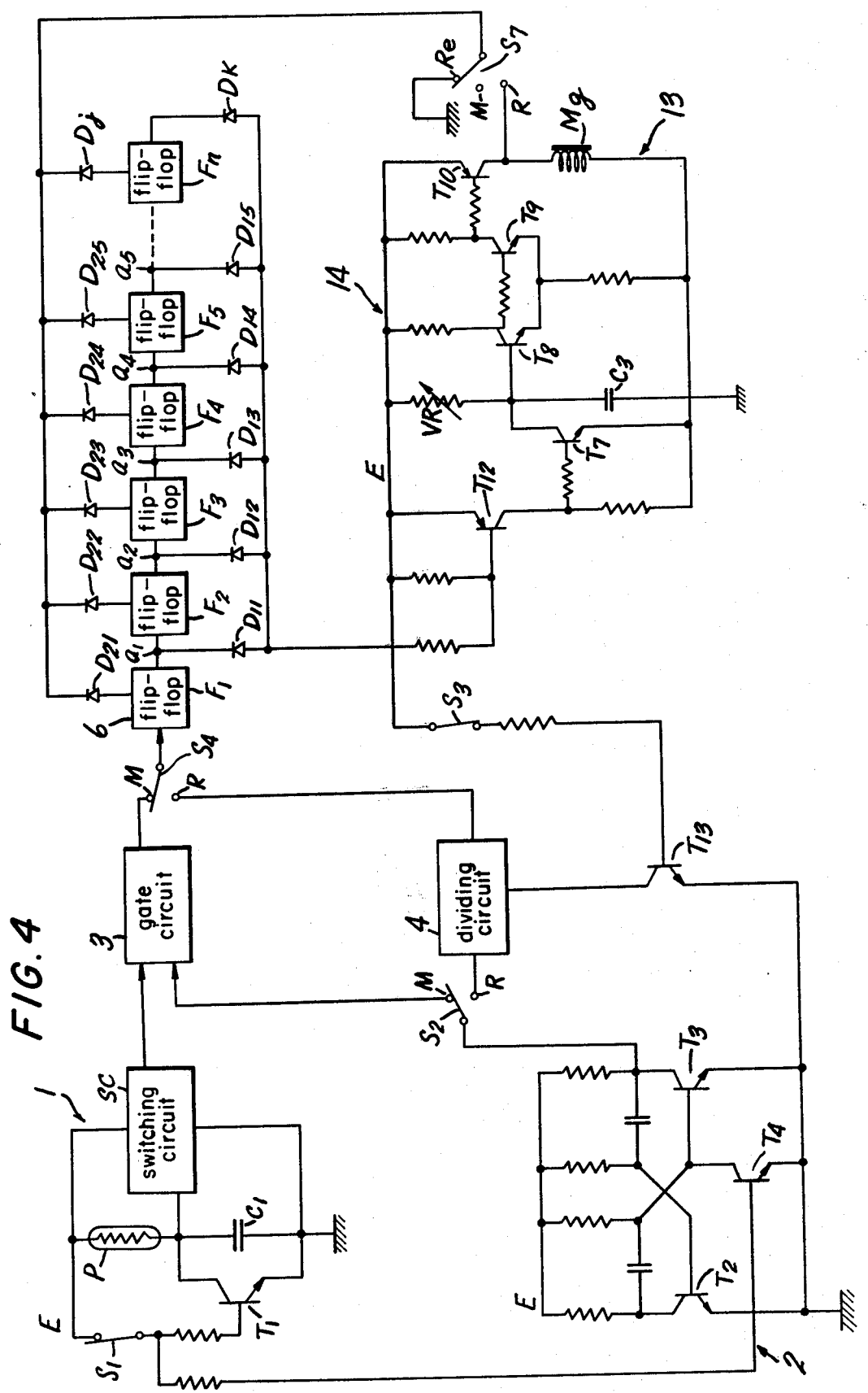

FIG. 4 is as embodiment of each block of FIG. 3 and a block corresponding to that shown in FIG. 2 is indicated with the same number.

In FIG. 4 the diodes D21, D22, D23, D24, D25, . . . Dj connected to the reversible counting circuit 6 are those used for resetting, and the diodes, D11, D12, D13, D14, D15, . . . Dk are the zero detection circuits for detecting an output of each flip-flop counecting stage, while the anode of each diode of the zero detection circuit is connected to the delay circuit 14, and to the collector of the output transistor T10 of the delay circuit 14 is connected an electromagnet Mg arranged in the shutter 13 as shown in the figure.

Now, the operation of the circuit is described. When the release button is pushed down, since the switch S7 is connected to the earth through the contact point Re as shown in the figure, each of the flip-flop circuit stages F1, F2, F3, F4, F5, . . . , Fn is reset by the diodes D21, D22, D23, D24, D25, . . . , Dj, and at the same time the frequency-dividing circuit 4 is also reset as explained with reference to FIG. 2. In this case, the output terminals a1, a2, a3, a4, a5, . . . , an of respective flip-flop circuits F1, F2, F3, F4, F5, . . . , Fn become high, and the diodes D11, D12, D13, D14, D15 . . . , Dk become in an interrupted state, so that the transistors T12, T7 become non-conductive and the condenser C3 begins charging. But since the transistors T12, T7 become conductive immediately after the pulses have been counted in the reversible counting circuit 6, if the shutter blade closing member controlled by the electromagnet Mg is stopped at the storing time by a separate member with the well-known method this may be good enough for not causing any trouble in the exposure operation.

By pushing down the release button further the switch S7 is changed over to the contact point M, the memory switch S1 is opened and the standard pulse from the pulses generator 2 are, owing to the non-activity of the transistors T1, T4, counted and stored in the reversible counting circuit 6 through the switch S2 by passing further through the gate circuit 3 and the switch S4.

Consequently, since at least one of the output terminals a1, a2, a3, a4, a5, . . . , an of respective counting stages will become low, the transistors T12, T7 become conductive and the transistor T8 becomes non-conductive. As the transistors T9, T10 become conductive because of the non-conductivity of the transistor T8, a current flows through the electromagnet Mg, energizing it to stop the shutter blade closing member. When the release button is further pushed down and the reflecting mirror for the finder begins to rise up, the switches S2, S4 and S7 are changed over from the side of contact point M to the side of contact point R. Due to the changing-over of the switch S2 to the side of contact point M, the pulse produced from the collector of the transistor S3 is sent to the frequency dividing circuit 4, but owing to the closing state of the timing switch S3 causing the transistor T13 to become conductive, there occurs no frequency-dividing. On the other hand, the cathodes of the diodes D21, D22, D23, D24, D25, . . . , Dj connected to the respective counting stages of the reversible counting circuit 6 are connected to the electromagnet Mg through the switch S7, but because the transistor T10 is conductive, the collector level thereof is so high that it becomes in an interrupted state and does not perform a resetting operation. When the shutter blade starts its opening operation and thereby the timing switch is opened by the shutter blade opening member (not shown in the figure), the transistor T13 becomes non-conductive and the pulses coming from the pulse generator 2 are applied to the frequency-dividing circuit 4 through the switch S2 and frequency-divided, then sent to the reversible counting circuit 6 through the switch S4, performing subtraction of the pulses stored in the reversible counting circuit 6 one by one, and when the memory value reaches zero, the output terminals a1, a2, a3, a4, a5, . . . , an of the respective counting circuit stages F1, F2, F3, F4, F5, . . . Fn all become high. Therefore, all of the diodes D11, D12, D13, D14, D15, . . . , Dk become non-conductive, and the transistor T12 becomes also non-conductive due to its base current being interrupted. Accordingly, a current flows into the condenser C3 through the variable resistor VR to begin charging, and after an elaspe of time determined by the resistance of the variable resistor VR and the capacity of the condenser C3, the transistor T8 becomes conductive. Therefore, the transistors T9, T10 become non-conductive, and the current flowing through the electromagnet Mg is interrupted, and then the shutter is closed. On the other hand, since the collector potential of the transistor T10 becomes equal to the earth potential due to the non-conductivity of the transistor T10, the cathodes of the diodes D21, D22, D23, D24, D25, . . . , Dj connected to the respective counting stages are lowered almost to the earth potential through the switch S7, and therefore, all of them become conductive and maintain each counting stage in a reset state (state of zero counting value). Here, the resistance value of the variable resistor VR is, as explained with reference to FIG. 2, adjusted beforehand in such a way that the shutter opening time and the memory value calling-out time are brought into synchronism.

In the embodiments of this invention mentioned above, a reversible counting circuit has been used as a counting circuit, but it is needless to say that this invention is applicable to a digital regeneration system for an electric shutter circuit of such a type that the pulse number varying according to the brightness of the photographed body is counted in a first counting circuit, and a pulse produced from a pulse generator synchrously with the start of shutter operation is counted in a second counting circuit, and when the counting values of the first and second counting circuits are coincident, a shutter closing signal is caused to appear.

As has been described above, since it is possible in this invention to synchronize the shutter opening time and the memory value calling-out time stored in the counting circuit quite simply by the adjustment of the delay circuit, there is no need of a complicated mechanical means, which is extremely advantageous.

We claim:

1. In a camera shutter control circuit of the type having means for developing a plurality of pulses the number of which is representative of an exposure time; a counting circuit for counting and storing the number of pulses representative of an exposure time; and read-out means for reading-out the number of stored pulses stored in said counting circuit to control an exposure time; the improvement which comprises:
    said read-out means comprising means responsive to a reset signal for rendering said reading-out means inoperative; and
    reset means for normally developing a reset signal to render said reading-out means inoperative and operable for terminating the reset signal after a variable selectible time delay to render said read-out means operative, said reset means including means operable for selecting said time delay, and said reset means renderable operative upon initiation of shutter opening to terminate the reset signal after the selected time delay and initiate reading-out of the stored pulses to control an exposure time, whereby selection of the reset means time delay to equal the shutter opening time is effective to synchronize shutter opening with the initiation of reading-out of the stored pulses and thereby eliminate exposure time error due to premature or late initiation of reading-out of the stored pulses.

2. In a camera shutter control circuit according to claim 1, wherein said reset means comprises a Schmitt circuit, and wherein said means operable for selecting said time delay comprises a variable resistor and a capacitor connected in series, the series combination of said variable resistor and said capacitor connected to develop the Schmitt circuit trigger voltage across said capacitor and to charge said capacitor through said variable resistor, whereby the time delay is equal to the time required to develop the Schmitt circuit trigger voltage and is controllable by controlling the resistance of said variable resistor.

3. In a camera automatic electric exposure time control circuit of the type having a digital memory system for storing a count of constant frequency pulses made during a period of time which is controlled by and representative of picture brightness, and means for reading-out the stored count over a period of time which commences on or after the production of a camera shutter opening signal and which is terminated by a second signal which is produced upon termination of the calling out operation and which is employed to effect closure of a shutter on or after production of said second signal the improvement wherein delay between the production of the camera shutter opening and the time when the shutter actually opens is compensated for by delay means adjusted to provide a delay which, when added to the read-out time, substantially equals the interval between the production of the camera shutter opening signal and shutter closure.

4. In an exposure time control circuit as claimed in claim 3, wherein the delay means develops, in response to the camera shutter opening signal, a delayed signal for initiating reading-out of the stored count.

5. In an exposure time control circuit as claimed in claim 3, wherein the delay means develops, in response to the signal, a delayed signal for initiating shutter closure.

6. In an exposure time control circuit as claimed in claim 4, wherein camera shutter opening signal is developed under control of a timing switch actuated by a shutter opening member and, after being delayed by the adjustable delay means, is employed to initiate read-out of the count, termination of the read-out, and closure of the shutter being initiated by the second signal.

* * * * *